(12) United States Patent
Rothweiler et al.

(10) Patent No.: US 12,369,764 B2
(45) Date of Patent: Jul. 29, 2025

(54) SUCTION APPARATUS HAVING A FILTER CLEANING DEVICE

(71) Applicant: Robert Bosch GmbH, Stuttgart (DE)

(72) Inventors: Christian Rothweiler, Leinfelden-Echterdingen (DE); Patrick Schlauch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 553 days.

(21) Appl. No.: 17/774,030

(22) PCT Filed: Oct. 28, 2020

(86) PCT No.: PCT/EP2020/080272
§ 371 (c)(1),
(2) Date: May 3, 2022

(87) PCT Pub. No.: WO2021/089379
PCT Pub. Date: May 14, 2021

(65) Prior Publication Data
US 2022/0378263 A1    Dec. 1, 2022

(30) Foreign Application Priority Data
Nov. 8, 2019    (DE) .................... 10 2019 217 304.7

(51) Int. Cl.
*A47L 9/20*    (2006.01)
*A47L 5/36*    (2006.01)
(Continued)

(52) U.S. Cl.
CPC ................. *A47L 9/20* (2013.01); *A47L 5/365* (2013.01); *B01D 46/0005* (2013.01); *B01D 46/66* (2022.01); *B01D 2279/55* (2013.01)

(58) Field of Classification Search
CPC .......... A47L 9/20; A47L 5/365; A47L 7/0095; A47L 9/00; A47L 9/2884; B01D 46/66;
(Continued)

(56) References Cited

U.S. PATENT DOCUMENTS 4,099,940 A * 7/1978 Mortensen ................ A47L 9/20
55/300
2004/0025285 A1    2/2004 McCormick et al.

FOREIGN PATENT DOCUMENTS

CN    101489462 A    7/2009
CN    104540431 A    4/2015
(Continued)

OTHER PUBLICATIONS

International Search Report corresponding to PCT Application No. PCT/EP2020/080272, mailed Feb. 8, 2021 (German and English language document) (6 pages).

*Primary Examiner* — Qianping He
(74) *Attorney, Agent, or Firm* — Maginot, Moore & Beck LLP (57) ABSTRACT

A suction apparatus includes a suction apparatus housing, including a filter for cleaning a suction flow, wherein the suction apparatus housing has at least one filter fastening element for securing the filter to the suction apparatus housing, and including a filter cleaning device for mechanically cleaning the filter. The filter, the filter fastening element and the filter cleaning device are arranged within the suction apparatus housing. The filter cleaning device includes an actuation device and a hammer device. The actuation device and the hammer device interact such that the hammer device can be actuated by using the actuation device and, when actuated, the hammer device applies at least one pulse to the filter securing element.

10 Claims, 3 Drawing Sheets

(51) Int. Cl.
*A47L 9/14* (2006.01)
*A47L 9/28* (2006.01)
*B01D 46/00* (2022.01)
*B01D 46/66* (2022.01)

(58) Field of Classification Search
CPC ............ B01D 46/0005; B01D 2279/55; B01D 29/085; B01D 46/76; B01D 46/42; A61C 17/08; E01H 1/0854
USPC ............................ 55/300, 304; 15/352; 96/35
See application file for complete search history.

(56) References Cited

FOREIGN PATENT DOCUMENTS

| | | | |
|---|---|---|---|
| CN | 107105950 | A | 8/2017 |
| CN | 107920706 | A | 4/2018 |
| CN | 110051276 | A | 7/2019 |
| DE | 37 90 084 | C2 | 3/1996 |
| DE | 600 05 391 | T4 | 2/2005 |
| EP | 1 493 374 | A2 | 1/2005 |
| EP | 1 629 760 | A2 | 3/2006 |
| EP | 1 839 550 | A2 | 10/2007 |
| EP | 2 002 773 | A2 | 12/2008 |
| EP | 2 829 210 | A2 | 1/2015 |
| JP | S52-30064 | A | 3/1977 |
| JP | 2009-5799 | A | 1/2009 |
| JP | 2015-47476 | A | 3/2015 |
| WO | 02/38025 | A1 | 5/2002 |
| WO | 2008/014795 | A1 | 2/2008 |
| WO | WO-2017012215 | A1 * | 1/2017 |

\* cited by examiner

SUCTION APPARATUS HAVING A FILTER CLEANING DEVICE

This application is a 35 U.S.C. § 371 National Stage Application of PCT/EP2020/080272, filed on Oct. 28, 2020, which claims the benefit of priority to Serial No. DE 10 2019 217 304.7, filed on Nov. 8, 2019 in Germany, the disclosures of which are incorporated herein by reference in their entirety.

The present disclosure relates to a suction device having a filter cleaning apparatus.

BACKGROUND

A vacuum cleaner having a filter cleaning is already known from EP 1 839 550 A2.

SUMMARY

The disclosed is based on a suction device having a suction device housing, having a filter for cleaning a suction flow, in particular inside the suction device housing, wherein the suction device housing has at least one filter securing element for at least indirectly securing the filter to the suction device housing, and having a filter cleaning apparatus for mechanically cleaning the filter, wherein the filter, the filter securing element and the filter cleaning apparatus are arranged at least partially inside the suction device housing. It is proposed that the filter cleaning apparatus have an in particular manually actuatable actuation apparatus and a hammer apparatus, wherein the actuation apparatus and the hammer apparatus cooperate in such a manner that the hammer apparatus can be actuated, in particular manually, using the actuation apparatus and the hammer apparatus when actuated applies at least one pulse to the filter securing element.

The disclosed provides a suction device by means of which the service-life of the suction device can be increased by the hammer apparatus applying at least one pulse to the filter securing element.

The term "suction device" is intended to be understood to be an electrical device which is constructed to produce a suction flow in order to draw in dust and/or dirt particles and/or liquids. For example, the suction device may be in the form of a vacuum cleaner.

In one embodiment, the suction device is a battery-operated suction device which can be operated by means of at least one battery, in particular by means of a hand-held power tool battery pack. The provision of electrical energy thereby takes place via an energy supply of the suction device by means of the at least one battery. In the context of the present disclosure, a "hand-held power tool battery pack" is intended to be understood to be a combination of at least one battery cell and a battery pack housing. The hand-held power tool battery pack is advantageously constructed to supply energy for commercial battery-operated hand-held power tools.

The suction device housing is at least provided to receive at least the filter securing element and the filter cleaning apparatus. The filter securing element and/or the filter cleaning apparatus can be arranged on the suction device housing and be connected to the suction device housing in a positive-locking, non-positive-locking and/or materially engaging manner. The suction device housing may be formed in one piece, two pieces or in several pieces. Thus, the suction device housing may, for example, comprise at least two housing portions which are constructed in the manner of a pot having a lid or in the manner of a sunny side and a shady side. The suction device housing may in one embodiment comprise an upper housing portion and a dust collection container. In this instance, the upper housing portion and the dust collection container may be able to be connected to each other in a releasable manner. The upper housing portion may in this instance have an electric motor, a control unit for controlling the suction device and the energy supply for supplying the suction device with electrical energy. In addition, the suction device housing may have at least one suction device axis. The suction device housing may be constructed in a substantially rotationally symmetrical manner around the suction device axis. For example, the suction device housing may be formed in the manner of a cylinder, in the manner of a cone or in the manner of a truncated cone.

The electric motor may drive the suction device as soon as the electric motor is supplied with electrical energy from the energy supply. When the electric motor is supplied with electrical power, it can produce at least one suction flow substantially through the suction device housing. A suction flow refers in this instance to an air draught substantially through the suction device housing over at least one suction device housing inlet and from at least one suction device housing outlet, wherein it is also conceivable for the suction flow to be able to be produced by means of a suction effect substantially through the suction device housing. By producing the suction flow, particles and/or fluids can be sucked and/or drawn in, for example, via a suction hose of the suction device. A suction hose has at least one suction opening and can preferably be releasably fitted to the suction device housing. The suction opening is constructed to absorb particles which occur by means of the suction flow during operation of the suction device.

The filter is constructed to filter the suction flow in terms of material and/or fluid particles and to clean the suction flow in this manner. The filter can be arranged inside the suction device housing. In the exemplary two-part embodiment of the suction device housing described above, the filter may be arranged on the upper housing portion and protrude into the dust collection container.

The suction device housing has the filter securing element for at least indirectly securing the filter to the suction device housing. The filter can thereby be at least indirectly connected to the suction device housing, in particular in a releasable manner. The at least indirect connection of the filter to the suction device housing may, for example, be a screw connection, a clamping connection, a snap-fitting connection, a hook connection or a bayonet connection. By way of example, as a result of the bayonet connection, both a simple-to-operate and also secure, at least indirect connection of the filter to the suction device housing can be produced. In the above-described exemplary two-part embodiment of the suction device housing, the filter securing element may arrange the filter on the upper housing portion in such a manner that the filter protrudes into the dust collection container. The filter securing element may, for example, be formed as a filter securing ring, a filter securing groove, a filter securing rail, a filter securing edge, a filter securing hook, a T-shaped filter securing profile, a filter securing shell, a filter securing pot or the like.

The filter cleaning apparatus is constructed to mechanically clean the filter. In this instance, "mechanical cleaning" is intended to be understood to be a cleaning of the filter substantially without the use of electrical energy of the energy supply and without the use of chemicals. By applying a pulse to the filter securing element, at least one vibration in the form of structure-borne noise can be introduced into the suction device housing. The at least one vibration can then be transmitted via the filter securing element to the filter so that dust and/or dirt particles as a result of the at least one vibration can be released from the filter. The filter cleaning apparatus cleans the filter substantially in terms of dust and/or dirt particles and fluids which have accumulated in and/or on the filter during its use. The filter cleaning apparatus is arranged at least partially inside the suction device housing. In the above-described exemplary two-part embodiment of the suction device housing, the filter cleaning apparatus may be arranged on the upper housing portion and/or on the dust collection container. In addition, the filter cleaning apparatus may be connected to the upper housing portion or the dust collection container.

The filter cleaning apparatus has the, in particular manually actuatable, actuation apparatus and the hammer apparatus. In the above-described exemplary two-part embodiment of the suction device housing, the actuation apparatus and/or the hammer apparatus may be arranged on the upper housing portion and/or the dust collection container. In this embodiment, it is also conceivable for the actuation apparatus and/or the hammer apparatus to be arranged inside the upper housing portion and/or the dust collection container. The actuation apparatus is constructed in such a manner that it can be manually actuated by a user. In the context of the present disclosure, "manually actuatable" is intended to be understood to be an in particular mechanical actuation, substantially without the use of electrical energy of the energy supply. In this instance, the actuation of the actuation apparatus by the user may, for example, be a pressing, a pushing, a pulling or a rotation of the actuation apparatus.

The actuation apparatus cooperates with the hammer apparatus in such a manner that, as soon as the user actuates the actuation apparatus, the actuation apparatus actuates the hammer apparatus.

The actuation apparatus is constructed in such a manner that it actuates the hammer apparatus, in particular manually, as soon as the user actuates the actuation apparatus. As described above, the term "manually actuate" is also intended in this case to be understood to be an in particular mechanical actuation substantially without the use of electrical energy. The actuation apparatus may in this instance by way of example press, strike, push, tilt, pivot, rotate or pull the hammer apparatus. The actuation of the hammer apparatus by means of the actuation apparatus can be understood to be a type of "activation" or "pretensioning" and subsequent "release". As soon as the actuation apparatus has actuated the hammer apparatus, the hammer apparatus can consequently apply the pulse to the filter securing element. In the above-mentioned, exemplary embodiment of the suction device with a suction device axis, the hammer apparatus can apply the pulse to the filter securing element axially with respect to the suction device axis, radially with respect to the suction device axis or transversely with respect to the suction device axis. In this instance, the term "axially with respect to the suction device axis" is intended to be understood to be parallel with the suction device axis. The term "radially with respect to the suction device axis" is intended to be understood to be perpendicular with respect to the suction device axis. The term "transversely with respect to the suction device axis" is intended to be understood to be obliquely, forming at least an angle in the range from 1° to 89°. In addition, the hammer apparatus may apply the pulse directly or indirectly to the filter securing element. The term "directly" in this instance is intended to be understood to be applying directly to the filter securing element. The term "indirectly" in this instance is intended to be understood to be applying indirectly to the filter securing element, via at least one other component or element. The hammer apparatus may, for example, apply the pulse in the form of structure-borne noise to the filter via the filter securing element. To this end, the structure-borne noise may be transmitted via the suction device housing, in particular the upper housing portion, from the hammer apparatus to the filter securing element.

By actuating the actuation apparatus, the hammer apparatus is consequently mechanically actuated and released in such a manner that the hammer apparatus applies a pulse to the filter. As a result of the pulse on the filter, it is freed from dust and/or dirt particles which have accumulated therein and/or thereon. As a result of the pulse, the dust and/or dirt particles can be released from the filter and can, for example, fall into the dust collection container.

In one embodiment of the suction device, the suction device housing has at least one cover, in particular a cover of an energy supply coupling means, wherein the cover can be pivoted from a first position of the cover into a second position of the cover about a cover pivot axis and the cover when moving from the first position of the cover into the second position of the cover actuates the filter cleaning apparatus, in particular the actuation apparatus. The cover of the suction device housing may at least terminate in a positive-locking manner with the suction device housing. The cover of the suction device housing is constructed to at least partially close at least a portion of the suction device housing. In the above-described, exemplary two-part embodiment of the suction device housing, the cover of the suction device housing may close at least a portion of the upper housing portion and/or the dust collection container. The cover of the suction device housing may in this instance close the suction device housing in such a manner that dust and/or dirt particles and/or fluids are impeded, in particular prevented, from penetrating into the suction device housing. The cover of the suction device housing may, for example, be formed in the manner of a flap, a shell, a half-shell or a pot.

The cover can be pivoted from the first position of the cover into the second position of the cover about the cover pivot axis. The first position of the cover may in this instance be an open position of the cover, in which at least a portion of the suction device housing may be open. The second position of the cover may be a closed position in which the cover terminates, in particular in a positive-locking manner, with the suction device housing, in particular the upper housing portion. In the above-mentioned, exemplary embodiment of the suction device with a suction device axis, the cover pivot axis may in this instance be arranged transversely, in particular perpendicularly, with respect to the suction device axis so that the suction device axis and the cover pivot axis intersect at least at one location. In this instance, it is also conceivable for the cover pivot axis and the suction device axis to be substantially parallel or skewed with respect to each other. The term "substantially parallel" in this instance is intended to be understood to mean that an angle in the range from 1° to 10° may be present between the cover pivot axis and the suction device axis. The suction device housing, in particular the upper housing portion, may have a receiving member for receiving the cover pivot axis. The cover can be pivotably supported using the receiving member of the cover pivot axis.

In the context of the present disclosure, the term "pivot" is intended to be understood to be an at least partial rotation of the cover of the suction device housing about the cover pivot axis, wherein the cover pivot axis is formed in a decentralized manner, in particular at the end side, on the cover of the suction device housing. The cover can be pivoted by the user about the cover pivot axis from the first, in particular open, position of the cover into the second, in particular closed, position of the cover.

During the movement, in particular pivot movement, of the cover of the suction device housing about the cover pivot axis from the first position of the cover into the second position of the cover, the filter cleaning apparatus, in particular the actuation apparatus, is actuated. To this end, the cover may be connected to the filter cleaning apparatus in a positive-locking, non-positive-locking and/or materially engaging manner in order to convert the pivot movement into the actuation of the filter cleaning apparatus. It is also conceivable for the cover during the movement, in particular pivot movement, from the second position of the cover into the first position of the cover to actuate the filter cleaning apparatus.

The cover and/or the filter cleaning apparatus may have at least one resilient element which is constructed to move, in particular pivot, the cover from the second position of the cover into the first position of the cover. The resilient element may in this instance be arranged in a circumferential direction about the cover pivot axis. The resilient element may, for example, be formed as a spring, a helical spring or as a leaf spring.

The cover may be the cover of an energy supply coupling means. The energy supply coupling means is constructed to receive the battery, in particular the hand-held power tool battery pack, and mechanically and electrically to connect it to the energy supply. The energy supply coupling means is arranged on the suction device housing, in particular on the upper housing portion, and connected thereto. The cover of the energy supply coupling means is constructed to cover, in particular to close, the energy supply coupling means in order to avoid, in particular to prevent, a penetration of dust and/or dirt particles and/or fluid into the energy supply coupling means. The cover of the energy supply coupling means may, for example, be constructed as a flap, a shell, a half-shell or a pot.

In one embodiment of the suction device, the cover has at least one receiving element and the actuation apparatus comprises at least one connection element and/or the cover has at least one connection element and the actuation apparatus comprises at least one receiving element, wherein the receiving element can be connected or is connected to the connection element, in particular in a rigid manner. The receiving element can receive the connection element. In this instance, the receiving element may enable at least a positive-locking, non-positive-locking and/or materially engaging connection to the connection element. The positive-locking, non-positive-locking and/or materially engaging connection of the connection element to the receiving element enables the movement, in particular the pivot movement, to be able to be transmitted from the cover to the actuation apparatus. The positive-locking, non-positive-locking and/or materially engaging connection of the receiving element to the connection element may be constructed, for example, as a hook connection, a tongue and groove connection, a snap-fit connection, a bayonet connection, a locking connection or a screw connection by means of at least one securing element, such as a screw. The cover and the actuation apparatus may be connected to each other in such a rigid manner that the cover can transmit a lever effect to the actuation apparatus.

The receiving element may be formed as a receiving member. In this instance, the receiving member may be formed, for example, as an opening, a recess or in the manner of a shell or a pot. The connection element may, for example, be constructed as a journal, a pin, a hook, a web, an edge or a bolt.

In one embodiment of the suction device, the actuation apparatus has at least one actuation element, wherein the actuation element is supported so as to be able to be pivoted about an actuation axis from a first position of the actuation apparatus into a second position of the actuation apparatus, and the actuation element actuates the hammer apparatus during pivoting. The actuation element is constructed to actuate the hammer apparatus. In the above-mentioned exemplary embodiment of the suction device with a suction device axis, the actuation axis can be arranged transversely, in particular perpendicularly, to the suction device axis. Furthermore, the actuation apparatus may be substantially parallel with the cover pivot axis. Preferably, the cover pivot axis and the actuation axis may be coaxial with respect to each other. The suction device housing, in particular the upper housing portion, may have a receiving member for receiving the actuation axis. Using the receiving member of the actuation axis, the actuation element can be pivotably supported.

In the first position of the actuation apparatus, the actuation element may abut the hammer apparatus or have substantially no connection to the hammer apparatus. During the pivot movement of the actuation element from the first position of the actuation apparatus into the second position of the actuation apparatus, the actuation element actuates the hammer apparatus. In this instance, the actuation element abuts the hammer apparatus and pivots the hammer apparatus. In the second position of the actuation apparatus, the actuation element may abut the hammer apparatus or have a spacing with respect to the hammer apparatus.

It is conceivable, when the actuation apparatus is in the first position thereof, for the cover to be in the first position thereof. In addition, it is conceivable, when the actuation apparatus is in the second position, for the cover to be in the second position thereof. It is thereby conceivable, when the cover is pivoted from the first position of the cover into the second position of the cover, for the actuation apparatus to be pivoted from the first position of the actuation apparatus into the second position of the actuation apparatus.

It is possible for the actuation element to actuate the hammer apparatus during pivoting from the second position of the actuation apparatus into the first position of the actuation apparatus. In the above-mentioned exemplary embodiment of the suction device with a suction device axis, it is additionally conceivable for the actuation axis to be arranged substantially parallel or skewed with respect to the suction device axis.

The actuation element may, for example, be formed in the manner of a pin, a web, a sheet, a rod, a hook, a journal, a roller, a spring or a projection. The actuation element may be integral with the receiving element or the connection element.

In one embodiment of the suction device, the actuation apparatus has at least one pivot element and the actuation element comprises at least one guiding element, wherein the guiding element is constructed to guide the pivot element during pivoting from a first position of the pivot element into a second position of the pivot element, in particular to keep it orientated, wherein the pivot element actuates the hammer apparatus using the actuation element. The pivot element is constructed in such a manner that it is pivotably supported about the actuation axis. The pivot element is arranged on the actuation element. In the first position of the pivot element, the pivot element may be substantially parallel with the actuation element and/or the guiding element. In addition, the pivot element may abut in the first position of the pivot element against the hammer apparatus or have a spacing with respect to the hammer apparatus. When the pivot element is pivoted from the first position of the pivot element into the second position of the pivot element using the guiding element, the pivot element actuates the hammer apparatus. In the second position of the pivot element, the pivot element may abut the hammer apparatus or have a spacing with respect to the hammer apparatus. In addition, in the second position of the pivot element, the pivot element may be substantially parallel with the actuation element and/or the guiding element. The guiding element may keep the pivot element orientated with respect to the actuation axis during the pivot movement.

The guiding element may be connected to the actuation element in a positive-locking, non-positive-locking and/or materially engaging manner. It is also possible for the guiding element and the actuation element to be integral. The guiding element is constructed in such a manner that it guides the pivot element during pivoting from the first position of the pivot element into the second position of the pivot element. To this end, the pivot element abuts at least partially against the guiding element. As soon as the actuation element is pivoted, the guiding element can be pivoted.

The pivot element can be arranged on the actuation element in such a manner that, when the actuation element is in the first position of the actuation apparatus, the pivot element may be in the first position of the pivot element. Furthermore, the pivot element may be in the second position of the pivot element when the actuation element is in the second position of the actuation apparatus.

It is also conceivable for the guiding element to guide the pivot element from the second position of the pivot element into the first position of the pivot element and in this instance to actuate the hammer apparatus.

The pivot element may, for example, be constructed in the manner of a cylinder, a cube, a parallelepiped, a ball having a web, a roller or the like. In this instance, the pivot element may, for example, have a U-shaped, a V-shaped, an L-shaped, a T-shaped or an I-shaped form. The guiding element may, for example, be constructed as a guiding path, a guiding face, a guiding web, a slotted guiding member or a guiding groove.

In one embodiment, the actuation element, the guiding element and the connection element of the actuation apparatus are constructed in one piece. In an alternative embodiment, the actuation element, the guiding element and the receiving element of the actuation apparatus are constructed in one piece.

In one embodiment of the suction device, the pivot element is connected to the actuation element by means of at least one actuation joint. An actuation joint is in this instance a movable connection of the pivot element to the actuation element. The actuation element may have at least one first receiving member and one second receiving member. The first receiving member of the actuation element may be constructed as a receiving member for a pin. In this instance, the first receiving member of the actuation element may be formed as at least one through-opening. It is conceivable for the first receiving member of the actuation element to be constructed as at least one pin, wherein the pin at least partially receives the pivot element. The second receiving member of the actuation element may at least partially receive the pivot element by the second receiving element of the actuation element engaging in the pivot element.

The pivot element may have at least one first receiving member and one second receiving member. The first receiving member of the pivot element may be constructed as at least one receiving member for a pin. By way of example, the first receiving member of the pivot element may be formed as at least one through-opening. The second receiving member of the pivot element may be constructed as a recess, wherein the recess can at least partially receive the second receiving member of the actuation element.

The actuation joint is constructed to pivotably support the pivot element with respect to the actuation element. The first receiving member of the actuation element, the first receiving member of the pivot element and at least one pin form the actuation joint. In this instance, the pin may connect the first receiving member of the actuation element and the first receiving member of the pivot element to each other.

In one embodiment of the suction device, the pivot element has at least one return element, wherein the return element is constructed to return the pivot element from a second relative position of the pivot element into a first relative position of the pivot element. The return element may be connected to the pivot element in a positive-locking, non-positive-locking and/or materially engaging manner. It is conceivable for the return element to be integral with the pivot element. The pivot element may have a receiving member for the return element, wherein the receiving member for the return element may be formed as a through-opening. The return element may be in the form of a rod, a pin, a roller, a sheet, a cube, a parallelepiped, a prism, or the like, or in the form of a resilient element, such as, for example, a spring, a helical spring or a leaf spring. The return element may have a mass in order to return the pivot element from the second relative position of the pivot element into the first relative position of the pivot element by means of a weight force of the mass of the return element.

The first relative position of the pivot element characterizes a substantially parallel arrangement of the pivot element relative to the actuation element. The second relative position of the pivot element characterizes an angular arrangement of the pivot element with respect to the actuation element. In this instance, the pivot element may form an angle in the range from 1° to 179° with respect to the actuation element.

When the pivot element is pivoted from the first position of the pivot element into the second position of the pivot element, the pivot element is kept orientated by the guiding element in the first relative position of the pivot element. As soon as the pivot element is pivoted from the second position of the pivot element into the first position of the pivot element, the pivot element can be arranged in the second relative position. When the pivot element is arranged in the second relative position of the pivot element, the return element enables the pivot element to be returned to the first relative position. When the pivot element is located in the first relative position of the pivot element, it is possible to allow the pivot element to reliably actuate the hammer apparatus when the actuation apparatus is pivoted from the first position of the actuation apparatus into the second position of the actuation apparatus. The return element therefore enables the actuation apparatus to be able to actuate the hammer apparatus again.

It is also conceivable for the return element to return the pivot element from the second relative position of the pivot element into the first relative position of the pivot element when the pivot element actuates the hammer apparatus during the pivot movement from the second position of the pivot element into the first position of the pivot element.

In one embodiment of the suction device, the hammer apparatus has at least one guiding element, wherein the guiding element of the hammer apparatus cooperates with the actuation apparatus in such a manner that the guiding element using the actuation apparatus pivots the hammer apparatus from a first position of the hammer apparatus into a second position of the hammer apparatus about a hammer apparatus axis. In this instance, the actuation element and/or the pivot element slides over the guiding element of the hammer apparatus and applies a pressure to the hammer apparatus via the guiding element of the hammer apparatus. The guiding element may be connected to the hammer apparatus in a positive-locking, non-positive-locking and/or materially engaging manner. It is also conceivable for the guiding element of the hammer apparatus to be integral with the hammer apparatus. The guiding element may, for example, be constructed as a guiding path, a guiding face, a guiding groove, a guiding web or as a slotted guiding member. The guiding element of the hammer apparatus may at least partially receive the actuation apparatus, in particular the actuation element or the pivot element. In this instance, the guiding element of the hammer apparatus can receive the actuation apparatus in such a manner that the guiding element of the hammer apparatus transmits the actuation by means of the actuation apparatus to the hammer apparatus. The pivot movement of the actuation apparatus, in particular of the actuation element or the pivot element, can thereby be transmitted from the first position of the actuation apparatus into the second position of the actuation apparatus. The guiding element can guide the actuation apparatus, in particular the actuation element and/or the pivot element, in order to guide the hammer apparatus from the first position of the hammer apparatus into the second position of the hammer apparatus.

In the first position of the hammer apparatus, the hammer apparatus may abut the suction device housing, in particular the upper housing portion, and/or the filter securing element. In the second position of the hammer apparatus, the hammer apparatus may have a spacing with respect to the suction device housing, in particular the upper housing portion, and/or the filter securing element. As soon as the actuation apparatus is actuated from the first position of the actuation apparatus into the second position of the actuation apparatus, the hammer apparatus is pivoted using the actuation element and/or the pivot element and the guiding element of the hammer apparatus from the first position of the hammer apparatus into the second position of the hammer apparatus. It is also conceivable for the actuation apparatus to actuate the hammer apparatus from the second position of the hammer apparatus into the first position of the hammer apparatus.

The hammer apparatus axis may be arranged transversely, in particular perpendicularly, to the suction device axis of the above-described, exemplary two-part embodiment of the suction device housing. It is conceivable for the hammer apparatus axis to be constructed in a skewed manner or substantially parallel with the suction device axis. Furthermore, the hammer apparatus axis may be substantially parallel with the actuation axis. The suction device housing, in particular the upper housing portion, may have a receiving member for receiving the hammer apparatus axis. The hammer apparatus can be pivotably supported by means of the receiving member of the hammer apparatus axis.

In one embodiment of the suction device, the hammer apparatus has at least one return element, wherein the return element is at least partially arranged between the hammer apparatus and the suction device housing and the return element returns the hammer apparatus about the hammer apparatus axis from the second position of the hammer apparatus into the first position of the hammer apparatus. The return element may abut the hammer apparatus and/or the suction device housing, in particular the upper housing portion. In this instance, the return element may form a positive-locking, non-positive-locking and/or materially engaging connection to at least one element of the hammer apparatus and/or the suction device housing, in particular the upper housing portion. The return element of the hammer apparatus may be formed as at least one mass, resilient element and/or spring element. The return element of the hammer apparatus as the mass can return the hammer apparatus from the second position of the hammer apparatus into the first position of the hammer apparatus by means of a weight force. The return element of the hammer apparatus as the mass may, for example, be in the form of a rod, a pin, a cube, a parallelepiped, a prism or the like. The return element of the hammer apparatus as the resilient element may, for example, be formed as a rubber buffer. The return element of the hammer apparatus as the spring element may, for example, be constructed as a spring, a helical spring or as a leaf spring.

It is conceivable for the return element of the hammer apparatus to return the hammer apparatus from the first position of the hammer apparatus into the second position of the hammer apparatus.

In one embodiment of the suction device, the hammer apparatus has at least one hammer element which is constructed, when the hammer apparatus is pivoted about the hammer apparatus axis from the second position of the hammer apparatus into the first position of the hammer apparatus, to transmit the pulse to the filter securing element. The hammer element may be connected to the hammer apparatus in a positive-locking, non-positive-locking and/or materially engaging manner. The hammer element may in the first position of the hammer apparatus abut the above-mentioned exemplary embodiment of the suction device, in particular the upper housing portion, and/or the filter securing element. In the second position of the hammer apparatus, the hammer element may have a spacing with respect to the suction device housing, in particular upper housing portion, and/or filter securing element. The hammer element may be constructed in the form of a mass. The hammer element as the mass may be constructed in the form of a cube, a parallelepiped, a pin, a rod, a cylinder, a cone, a truncated cone, a pyramid, a truncated pyramid, or the like.

When the hammer apparatus is pivoted from the second position of the hammer apparatus into the first position of the hammer apparatus, the hammer element can transmit the pulse using the return element of the hammer apparatus to the filter securing element. To this end, the hammer element can convert an in particular mechanical energy into the pulse, wherein the in particular mechanical energy can be provided by the return element. The hammer element can transmit the pulse to the filter securing element in an axial and/or radial direction with respect to the suction device axis to the filter securing element.

In one embodiment, the hammer apparatus has a hammer housing, wherein the hammer housing receives at least the hammer apparatus axis, the guiding element of the hammer apparatus, the receiving member for the return element of the hammer apparatus and the hammer element. In this instance, the hammer housing, the guiding element of the hammer apparatus and the receiving member for the return element of the hammer apparatus may be constructed integrally. The hammer housing may have a receiving member for the hammer element, wherein the hammer housing and the hammer element can be connected to each other in a positive-locking, non-positive-locking and/or materially engaging manner.

BRIEF DESCRIPTION OF THE DRAWINGS

The disclosure is explained below with reference to a preferred embodiment. In the drawings below.

DETAILED DESCRIPTION

Figure 1:
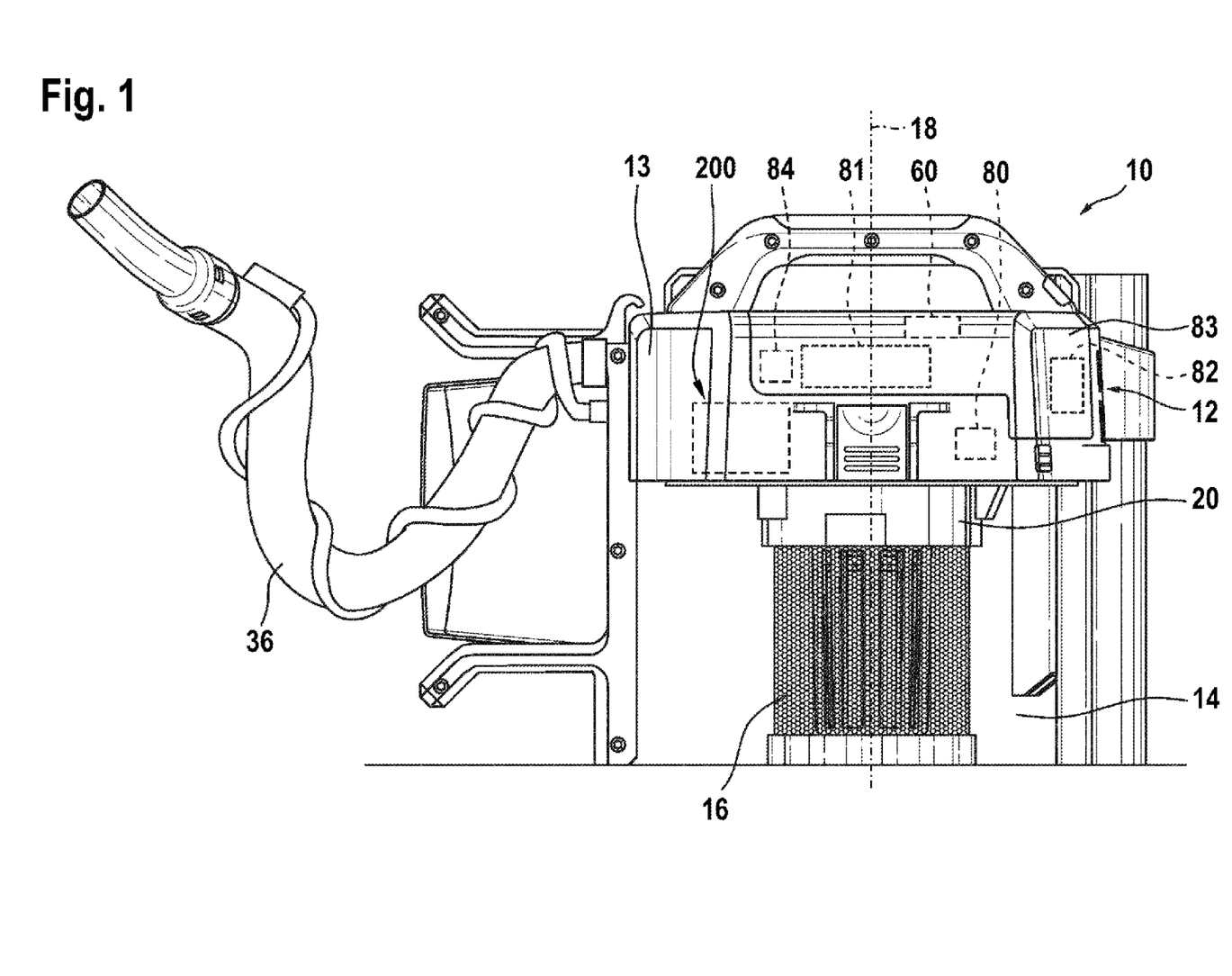
FIG. 1 shows a schematic view of a suction device according to the disclosure.

FIG. 1 shows a suction device 10 according to the disclosure having a suction device housing 12, having a filter 16, having a filter securing element 20, having a filter cleaning apparatus 200 and having a suction hose 36. In this instance, the suction device housing 12 comprises an upper housing portion 13 and a dust collection container 14 as a lower housing portion. In this embodiment of the disclosure, the suction hose 36 can be fitted to the suction device housing 12 in a reversible, releasable manner.

In this embodiment, the suction device 10 is constructed as a battery-operated suction device which is operated by means of at least one battery 82, in particular by means of a hand-held power tool battery pack. Consequently, the energy required for the suction device 10 is provided by an energy supply 81 by means of the at least one battery 82. The battery 82 is connected to the energy supply 81 by means of an energy supply coupling means 84.

The upper housing portion 13 and the dust collection container 14 are connected to each other in a reversible, releasable manner. In this embodiment, the upper housing portion 13 comprises an electric motor 80, a control unit for controlling the suction device 10 and the energy supply 81 for supplying the suction device 10 with electrical energy. The suction device housing 12 further comprises a suction device axis 18. In this instance, the suction device housing 12 is formed substantially in a rotationally symmetrical manner about the suction device axis 18, in the manner of a hollow cylinder. In addition, the suction device housing 12 has a cover 83 for the energy supply coupling means 84, see also FIG. 2. In this instance, the cover 83 terminates in a positive-locking manner with the suction device housing 12 in order to at least partially close at least a portion of the suction device housing 12. The cover 83 comprises a connection element which is not illustrated in greater detail, see also FIGS. 2 and 3.

The electric motor 80 drives the suction device 10 using electrical energy from the energy supply 81. As soon as the electric motor 80 is supplied with electrical energy, it produces a suction flow substantially through the suction device housing 12 in order to draw in particles and/or fluids via the suction hose 36 of the suction device 10.

The filter 16 filters material and/or fluid particles from the suction flow and cleans the suction flow in this case. In this instance, the filter 16 is arranged inside the suction device housing 12, wherein the filter 16 is arranged on the upper housing portion 13 and protrudes into the dust collection container 14.

The filter securing element 20 is arranged on the upper housing portion 13. The filter securing element 20 is in this instance constructed to directly secure the filter to the suction device housing 12. The filter 16 is releasably connected to the upper housing portion 13.

Furthermore, the suction device 10 comprises the filter cleaning apparatus 200, wherein the filter cleaning apparatus 200 cleans the filter 16 mechanically substantially in terms of dust and/or dirt particles and fluids. In this instance, the filter cleaning apparatus 200 is arranged inside the suction device housing 12, on the upper housing portion 13.

Figure 2:
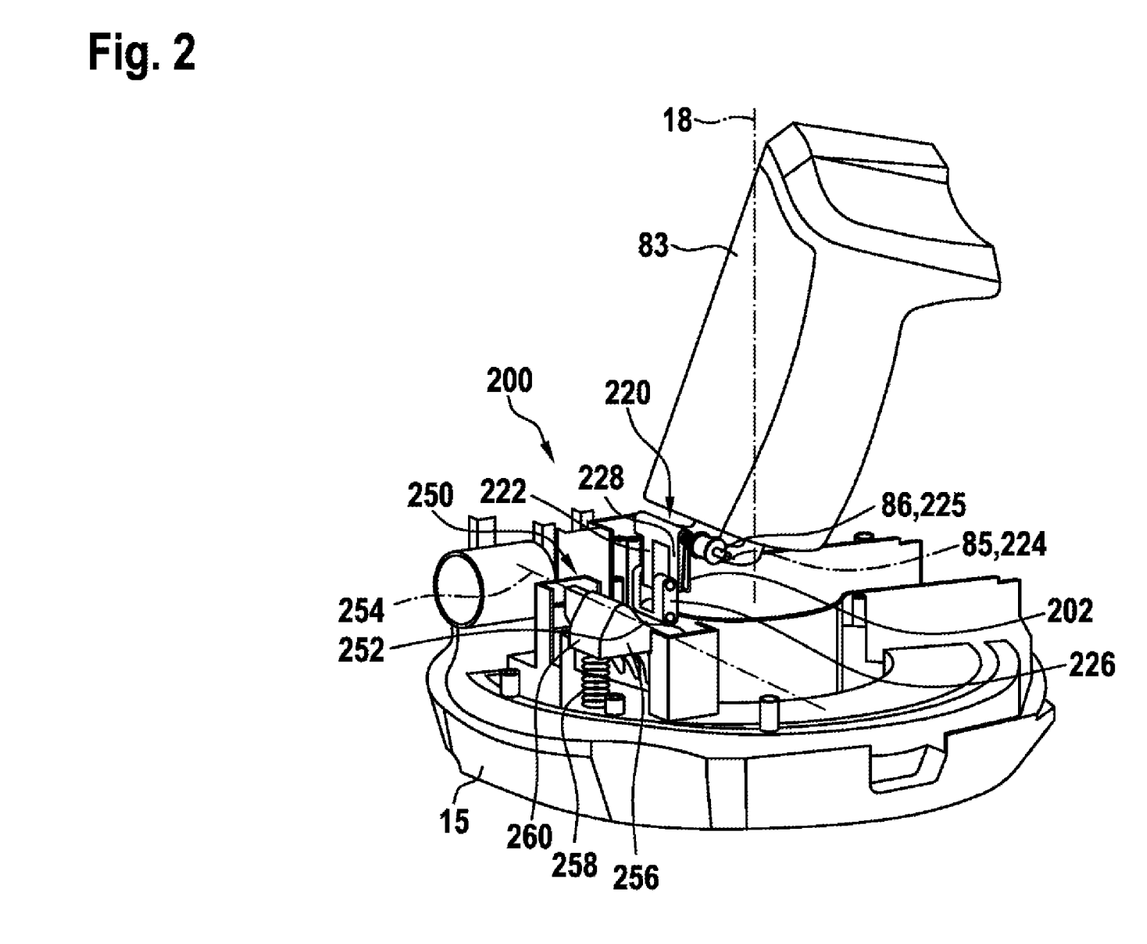
FIG. 2 shows a perspective view of a base plate of the upper housing portion with a filter cleaning apparatus.

FIG. 2 shows a perspective view of a base plate 15 of the upper housing portion 13 with the filter cleaning apparatus 200. In this instance, the filter cleaning apparatus 200 comprises a manually actuatable actuation apparatus 220 and a hammer apparatus 250. The actuation apparatus 220 and the hammer apparatus 250 are arranged on the base plate 15. The actuation apparatus 220 is constructed in such a manner that the actuation apparatus 220 actuates the hammer apparatus 250 so that the hammer apparatus 250 applies a pulse to the filter securing element 20. The hammer apparatus 250 applies the pulse to the filter securing element 18 axially with respect to the suction device axis 18. The hammer apparatus 250 applies the pulse in this instance to the base plate 15, wherein the filter securing element 18 is mounted on the base plate 15 from the lower side thereof (not illustrated in greater detail in this instance).

As described above, the suction device housing 12 comprises as a component the cover 83 of the energy supply coupling means 84. The energy supply coupling means 84 is not illustrated in greater detail in this instance. The cover 83 can be pivoted from a first position of the cover 83 into a second position of the cover 83 about a cover pivot axis 85. FIG. 2 shows the cover 83 in the first position of the cover 83, whereas FIG. 1 shows the cover 83 in the second position of the cover 83. The cover 83 actuates the actuation apparatus 220 when the cover 83 is moved from the first position of the cover 83 into the second position of the cover 83. In this instance, the cover 83 is pivotably supported about the cover pivot axis 85, in this instance formed by a rod 86. In the first position of the cover 83, the cover 83 is open. In the second position of the cover 83, the cover 83 is closed. In this instance, the cover pivot axis 85 is arranged transversely, in particular perpendicularly, relative to the suction device axis 18.

The upper housing portion 13 comprises a receiving member which is not illustrated in greater detail for receiving the cover pivot axis 85, whereby the cover pivot axis 85 and indirectly the cover 83 are secured so as to be pivotably supported on the upper housing portion 13. The cover 83 is connected to the actuation apparatus 220 at least in a positive-locking manner. The actuation apparatus 220 thereby converts the movement of the cover into the actuation of the filter cleaning apparatus 200.

The filter cleaning apparatus 220 comprises a resilient element 202, which pivots the cover 83 from the second position of the cover 83 into the first position of the cover 83. In this instance, the resilient element 202 is arranged in the circumferential direction about the cover pivot axis 85 and constructed as a spring, see also FIG. 3.

The actuation apparatus 220 comprises an actuation element 222. The actuation element 222 is in this instance constructed in the manner of a web. The actuation element 222 is supported so as to be able to be pivoted about an actuation axis 224 from a first position of the actuation apparatus 220 into a second position of the actuation apparatus 220. The actuation element 222 actuates the hammer apparatus 250 when the actuation apparatus 220 pivots from the first position of the actuation apparatus 220 into the second position of the actuation apparatus 220. In this instance, the actuation axis 224 is arranged transversely with respect to the suction device axis 18, in particular perpendicularly thereto. The actuation axis 224 is in this instance formed by a rod 225. In addition, the cover pivot axis 85 and the actuation axis 224 are produced coaxially with respect to each other and by the same rod 86, 225. As already mentioned, the upper housing portion 13 comprises a receiving member which is not illustrated in greater detail for receiving the cover pivot axis 85 and consequently also for receiving the actuation axis 224.

The actuation apparatus 220 comprises a pivot element 226. The actuation element 222 has a guiding element 228. In addition, the guiding element 228 is in this instance formed integrally with the actuation element 222. The guiding element 228 guides the pivot element 226 during pivoting from a first position of the pivot element 226 into a second position of the pivot element 226. The pivot element 226 partially abuts in this instance the guiding element 228 in such a manner that it pivots therewith. The pivot element 226 actuates the hammer apparatus 250 using the actuation element 222. In this instance, the pivot element 226 is pivotably supported about the actuation axis 224. In this embodiment, the pivot element 226 is arranged on the actuation element 222, for example, by means of an actuation joint 232. In this instance, the pivot element 226 is U-shaped. Furthermore, the guiding element 228 is formed as a guiding face.

The hammer apparatus 250 comprises a guiding element 252. The guiding element 252 of the hammer apparatus 250 pivots the hammer apparatus 250 using the actuation apparatus 220 from a first position of the hammer apparatus 250 into a second position of the hammer apparatus 250 about a hammer apparatus axis 254, see also FIG. 3. The hammer apparatus axis 254 is arranged transversely relative to the suction device axis 18. In addition, the hammer apparatus axis 254 is substantially parallel with the actuation axis 224. In this instance, the upper housing portion 13 comprises a receiving member which is not illustrated in greater detail for the hammer apparatus axis 254 so that the hammer apparatus 250 is pivotably supported, in this instance formed by a rod 225.

The hammer apparatus 250 comprises a hammer housing 256. The hammer housing 256 receives the hammer apparatus axis 254 and the guiding element 252 of the hammer apparatus 250, wherein the guiding element 252 of the hammer apparatus 250 is integral with the hammer housing 256. The guiding element 252 of the hammer apparatus is constructed in this instance as a guiding face. In this instance, the pivot element 226 slides along the guiding element 252 of the hammer apparatus 250 so that the actuation apparatus 220 actuates the hammer apparatus 250.

The hammer apparatus 250 comprises a return element 258. In this instance, the return element 258 is arranged at least partially between the hammer apparatus 250 and the base plate 15. The return element 258 guides the hammer apparatus 250 about the hammer apparatus axis 254 from the second position of the hammer apparatus 250 into the first position of the hammer apparatus 250. In this instance, the return element 258 in each case abuts the hammer apparatus 250 and the base plate 15. The return element 258 of the hammer apparatus 250 is in this instance constructed as a helical spring. The hammer housing 256 has a receiving member 260 for the return element 258 and receives it in a positive-locking manner. In this instance, the receiving member 260 for the return element 258 and the hammer housing 256 is integral.

Figure 3:
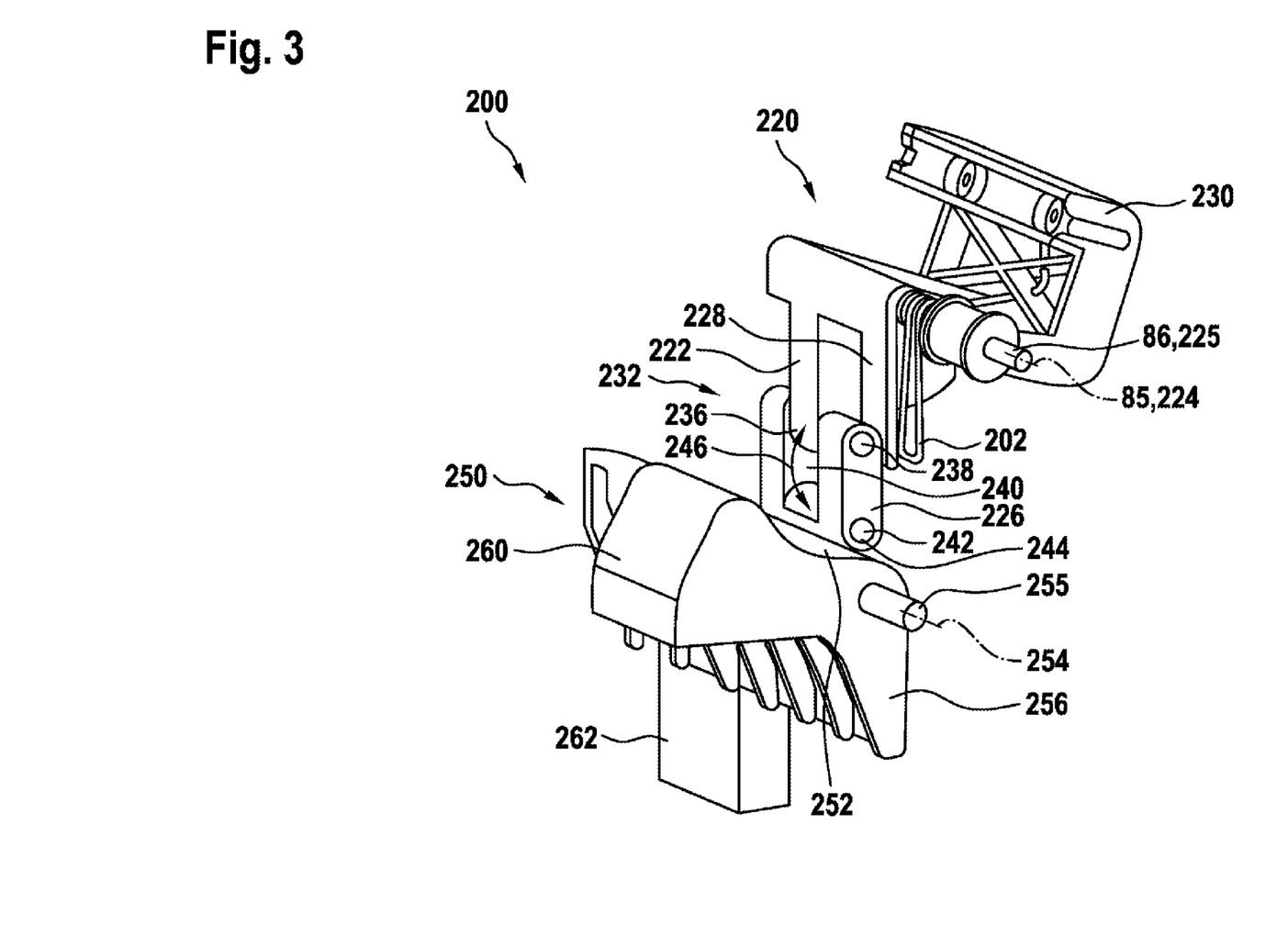
FIG. 3 shows a perspective view of the filter cleaning apparatus.

FIG. 3 shows a perspective view of the filter cleaning apparatus 200. The actuation apparatus 220 has a receiving element 230. The receiving element 230 connects the actuation apparatus 220 to the connection element of the cover 83. The receiving element 230 forms a positive-locking connection to the connection element. The receiving element 230 is formed as a shell-like receiving member. In this instance, the actuation element 222, the guiding element 228 of the actuation apparatus 220 and the receiving element 230 of the actuation apparatus 220 are integral.

The actuation apparatus 220 comprises the actuation joint 232. The pivot element 226 is in this instance pivotably connected to the actuation element 222 by means of the actuation joint 232. In this instance, the actuation element 222 comprises a first receiving member 234 and a second receiving member 236. The first receiving member 234 of the actuation element 220 is not illustrated in greater detail in this instance, wherein the first receiving member 234 is formed as a through-opening for a pin. The second receiving member 236 of the actuation element 220 at least partially receives the pivot element 226. To this end, the second receiving element 236 of the actuation element 222 engages in the pivot element 226.

In this instance, the pivot element 226 comprises a first receiving member 238 and a second receiving member 240. In this instance, the first receiving member 238 of the pivot element 226 is formed as a receiving member for a pin. In this instance, the first receiving member 238 of the pivot element 226 is constructed as a through-opening. In this embodiment, the second receiving member 240 of the pivot element 226 is formed as a recess which at least partially receives the second receiving member 236 of the actuation element 222.

The actuation joint 232 is formed using the first receiving member 238 of the pivot element 222, the first receiving member 234 of the actuation element 222 and at least one pin which is not illustrated in greater detail. The pin connects the first receiving member 238 of the pivot element 226 to the first receiving member 234 of the actuation element.

The pivot element 226 comprises a return element 242. The return element 242 guides the pivot element 226 from a second relative position of the pivot element 226 back into a first relative position of the pivot element 226. In this instance, the return element 242 is connected to the pivot element 226 in a positive-locking manner. In this instance, the return element 242 is received in a receiving member 244 of the pivot element 226. The return element 242 is in the form of a rod.

In this embodiment, the pivot element 226 is arranged in the second relative position of the pivot element 226 at an angle with respect to the actuation element 222. The pivot element 226 has in this instance an angle 246 in the range from 1° to 179° with respect to the actuation element. In the first relative position of the pivot element 226, the pivot element 226 is arranged substantially parallel with the actuation element 222. The return element 242 enables the pivot element 226 to be pivoted from the second relative position of the pivot element 226 into the first relative position of the pivot element 226.

The hammer apparatus 250 comprises a hammer element 262. The hammer element 262 is pivotably supported about the hammer apparatus axis 254. The hammer element 262 transmits the pulse to the filter securing element 20 when the hammer apparatus 250 is pivoted from the second position of the hammer apparatus 250 into the first position of the hammer apparatus 250. In this instance, the hammer housing 256 receives the hammer element 262 in a positive-locking manner. The hammer element 262 is in this instance in the form of a parallelepipedal mass.

The invention claimed is:

1. A suction device, comprising:
a suction device housing;
a filter configured to clean a suction flow, wherein the suction device housing has at least one filter securing element configured to at least indirectly securing the filter to the suction device housing; and
a filter cleaning apparatus configured to mechanically clean the filter, wherein:
the filter, the at least one filter securing element, and the filter cleaning apparatus are arranged at least partially inside the suction device housing;
the filter cleaning apparatus has an actuation apparatus and a hammer apparatus;
the actuation apparatus and the hammer apparatus cooperate such that the hammer apparatus is actuated using the actuation apparatus;
the hammer apparatus when actuated applies at least one pulse to the at least one filter securing element;
the suction device housing has at least one cover of an energy supply coupling means;
the at least one cover is configured to pivot from a first position of the at least one cover into a second position of the at least one cover about a cover pivot axis; and
the at least one cover when moving from the first position of the at least one cover into the second position of the at least one cover actuates the actuation apparatus.

2. The suction device as claimed in claim 1 wherein:
the at least one cover has at least one receiving element configured to be connected to at least one connection element of the actuation apparatus; and/or
the actuation apparatus comprises at least one connection element configured to be connected to at least one receiving element of the at least one cover.

3. The suction device as claimed in claim 1, wherein:
the actuation apparatus has at least one actuation element;
the at least one actuation element is supported so as to pivot about an actuation axis from a first position of the actuation apparatus into a second position of the actuation apparatus; and
the at least one actuation element actuates the hammer apparatus during pivoting.

4. The suction device as claimed in claim 3, wherein:
the actuation apparatus has at least one pivot element;
the at least one actuation element comprises at least one guiding element;
the at least one guiding element is configured to guide the at least one pivot element during pivoting from a first position of the at least one pivot element into a second position of the at least one pivot element so as to keep the at least one pivot element orientated with respect to the actuation axis; and
the at least one pivot element actuates the hammer apparatus using the at least one actuation element.

5. The suction device as claimed in claim 4, wherein the at least one pivot element is connected to the at least one actuation element by at least one actuation joint.

6. The suction device as claimed in claim 4, wherein:
the at least one pivot element has at least one return element; and
the at least one return element is constructed to return the at least one pivot element from a second relative position of the at least one pivot element relative to the at least one actuation element into a first relative position of the at least one pivot element relative to the at least one actuation element.

7. The suction device as claimed in claim 1, wherein:
the hammer apparatus has at least one guiding element; and
the at least one guiding element of the hammer apparatus cooperates with the actuation apparatus such that the at least one guiding element using the actuation apparatus pivots the hammer apparatus from a first position of the hammer apparatus into a second position of the hammer apparatus about a hammer apparatus axis.

8. The suction device as claimed in claim 7, wherein:
the hammer apparatus has at least one return element;
the at least one return element is at least partially arranged between the hammer apparatus and the suction device housing; and
the at least one return element returns the hammer apparatus about the hammer apparatus axis from the second position of the hammer apparatus into the first position of the hammer apparatus.

9. The suction device as claimed in claim 8, wherein:
the hammer apparatus has at least one hammer element configured to transmit the at least one pulse to the at least one filter securing element when the hammer apparatus is pivoted about the hammer apparatus axis from the second position of the hammer apparatus into the first position of the hammer apparatus.

10. A suction device, comprising:
a suction device housing;
a filter configured to clean a suction flow, wherein the suction device housing has at least one filter securing element configured to at least indirectly securing the filter to the suction device housing; and
a filter cleaning apparatus configured to mechanically clean the filter, wherein:
the filter, the at least one filter securing element, and the filter cleaning apparatus are arranged at least partially inside the suction device housing;
the filter cleaning apparatus has an actuation apparatus and a hammer apparatus;
the actuation apparatus and the hammer apparatus cooperate such that the hammer apparatus is actuated using the actuation apparatus;
the hammer apparatus when actuated applies at least one pulse to the at least one filter securing element;
the actuation apparatus has at least one actuation element;
the at least one actuation element is supported so as to pivot about an actuation axis from a first position of the actuation apparatus into a second position of the actuation apparatus;
the at least one actuation element actuates the hammer apparatus during pivoting;
the actuation apparatus has at least one pivot element;
the at least one actuation element comprises at least one guiding element;
the at least one guiding element is configured to guide the at least one pivot element during pivoting from a first position of the at least one pivot element into a second position of the at least one pivot element so as to keep the at least one pivot element orientated with respect to the actuation axis; and the at least one pivot element actuates the hammer apparatus using the at least one actuation element.

* * * * *